United States Patent [19]

Kubota et al.

[11] Patent Number: 4,842,210
[45] Date of Patent: Jun. 27, 1989

[54] METHOD AND DEVICE FOR WINDING MAGNETIC TAPE USING MAGNETIC ALIGNMENT

[75] Inventors: Kazuo Kubota; Masaaki Sakaguchi, both of Kanagawa, Japan

[73] Assignee: Fuji Photo Film Co., Ltd., Kanagawa, Japan

[21] Appl. No.: 34,955

[22] Filed: Apr. 6, 1987

[30] Foreign Application Priority Data

Apr. 7, 1986 [JP] Japan .................................. 62-78309

[51] Int. Cl.$^4$ ...................... B65H 18/00; G11B 15/30
[52] U.S. Cl. .................................. 242/67.1 R; 242/76
[58] Field of Search .................... 242/67.1 R, 76, 78, 242/78.1, 179, 186; 226/93–97; 360/66

[56] References Cited

U.S. PATENT DOCUMENTS 4,343,441  8/1982  Graham .............................. 242/68.1
4,566,647  1/1986  Iwamoto et al. ............. 242/67.1 R

FOREIGN PATENT DOCUMENTS 61-51642  3/1986  Japan .

Primary Examiner—Stuart S. Levy
Assistant Examiner—Steven M. duBois
Attorney, Agent, or Firm—Sughrue, Mion, Zinn, Macpeak & Seas

[57] ABSTRACT

A tape winding method and apparatus in which a magnetic tape is wound on a reel having only one flange. During winding a magnetic field is applied across the width of the magnetic tape and a pressure disk biases the tape against the flange. Both mechanisms true the edge of the tape to the flange.

4 Claims, 3 Drawing Sheets 4,842,210

METHOD AND DEVICE FOR WINDING MAGNETIC TAPE USING MAGNETIC ALIGNMENT

BACKGROUND OF THE INVENTION

1. Field of the Invention

The present invention relates to a method and a device for winding a magnetic tape, such as winding a magnetic tape of prescribed length from a source roll of a magnetic tape to a small tape winding body, rewinding a magnetic tape from a tape winding body to another tape winding body, winding a magnetic tape of large width for a source "roll", and winding a magnetic tape of large width to a plurality of tape winding bodies while slitting the tape.

2. Background of the Invention

A process of manufacturing a magnetic tape such as an audio cassette tape, a video cassette tape, a memory tape or a broadcasting video tape includes a step of winding a magnetic tape of prescribed length from a source roll of a large-length tape to a small tape winding body such as a reel and a hub, a step of rewinding a magnetic tape from a tape winding body to another tape winding body, a step of winding a magnetic tape of large width as a source tape, a step of winding a magnetic tape slit from another magnetic tape, and so forth. When the magnetic tape is wound on the tape winding body in the process of the winding or the rewinding, the tape may vibrate in the direction of the thickness of the tape and this vibration can fluctuate due to the physical properties of the magnetic tape and those of the tape winding body so that each side edge of the tape wound on the winding body is unneatly overlaid on itself. The higher that the speed of the winding is, the more unneatly the side edge is overlaid on itself.

A magnetic tape whose side edge is unneatly overlaid on itself as described above has problems that the external appearance of the wound tape housed as a commercial product in a magnetic tape cassette is bad. Furthermore, the side edge is likely to be damaged resulting in various troubles such as the deterioration of the electromagnetic converting properties of the tape. The unneat overlaying is a serious drawback, particularly for a magnetic video tape for high-density recording, because an audio signal or a tuning signal is recorded near the side edge of the tape. For these reasons, in a conventional process of manufacturing a magnetic tape, the wound states of all magnetic tapes are visually inspected or the like after a winding process or a rewinding process. Since the inspection takes much time and money, the inspection is a major disadvantage in the magnetic tape manufacturing process.

In the conventional system shown in FIG. 1, a belt 15 made of a relatively soft nonwoven fabric or the like is provided between one flange of the tape winding body 2 and one side edge of the magnetic tape T to push the side edge of the tape T under relatively high pressure while the belt is supported by a roller 17 or the like and wound at a low constant speed from a belt send-out member 16 to a belt winding member 18 so as to neatly wind the tape.

In the neat winding system, described above, it is desirable to increase the pressure to the belt 15 in order to obtain high efficiency. However, since the belts 15 are placed in direct contact with the magnetic tape T in the above-mentioned system, there are various problems that the magnetic layer of the tape T is worn or the fibers of the nonwoven fabric come off to locally hinder recording on the tape T, inappropriate pressure acts to deform the tape T or damage its side edge, and so forth. For that reason, the system does not function properly. In addition, since the wear and tear of the neat winding system is large, it has disadvantages with regard to its cost and maintenance as well.

In addition to the neat winding method using the belt 15 or the like as described above, there has been proposed another neat winding method using a pressure disk 30 as shown in FIG. 2.

In this case, a tape reel 2 having a single flange 2a at one side is mounted on a rotary shaft 34. The pressure disk 30 formed of synthetic resin is mounted on the rotary shaft 34 so as to be slidable axially and rotatable in synchronism with the tape reel 2. In other words, when a magnetic tape T is taken up by the tape reel 2, the tape edge of the magnetic tape T is pressed toward the flange 2a by the pressure disk 30 (by the force according to its own weight or the like). However, the increase in pressure of the pressure disk 30 required for performing neat winding has induced various disadvantages, such as injury of the tape edge, transformation of the tape, unfitness for high-speed winding and the like, similarly to the case of the system of FIG. 1.

SUMMARY OF THE INVENTION

In view of such circumstances, an object of the present invention is to provide a magnetic tape winding method and apparatus, in which a magnetic tape can be wound on a tape winding body without a disordered appearance in spite of wide variety of the physical properties of the tape.

Another object of the invention is to provide a magnetic tape winding method and apparatus in which deterioration of tape quality or the like which can be caused, for example, by mechanical contact with a magnetic tape with a relatively large force as in the prior art neat winding method can be eliminated and in which the workability in tape winding process can be improved.

The foregoing objects of the invention are attained by a magnetic tape winding method in which when a magnetic tape is to be wound on a tape reel having a single flange at one side, the magnetic tape is wound while a tape edge of the magnetic tape layer which has already been wound on the reel is urged against the flange by a pressure disk. The lateral mechanical urging is performed under the condition that a magnetic field for energizing the magnetic tape toward the flange is applied to the magnetic tape at least in the vicinity of the reel. In an apparatus which enables the method to be carried out, a magnetic tape winding apparatus winds a magnetic tape on a reel provided with a flange at one side while rotating the reel. The apparatus comprises a pressure disk for urging a tape edge of the magnetic tape against the flange and a magnet for generating a magnetic field to energize the magnetic tape toward the flange at least in the vicinity of the reel.

DETAILED DESCRIPTION OF THE PREFERRED EMBODIMENT

Figure 1:
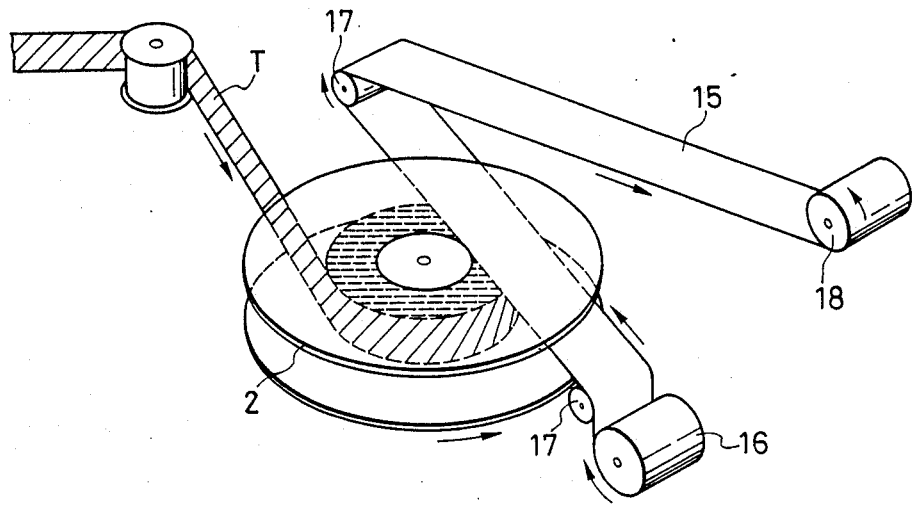
FIGS. 1 and 2 are schematic perspective views respectively showing a part of a conventional tape take-up apparatus.
Figure 2:
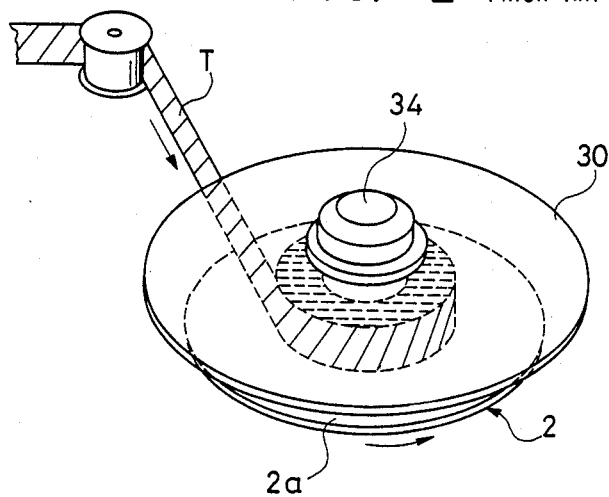

Now referring to the drawings, an embodiment of the apparatus by which the method according to he present invention is carried out.

Figure 3:
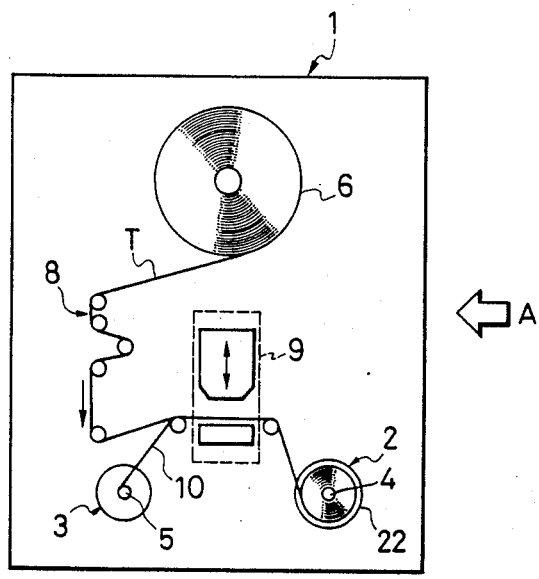
FIG. 3 is a schematic front view of an embodiment of the tape take-up apparatus in accordance with the present invention.
Figure 4:
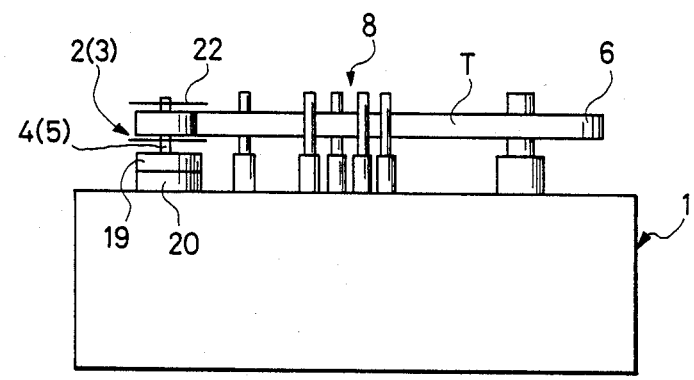
FIG. 4 is a schematic side view of the embodiment of FIG. 3.

FIG. 3 is a schematic front view of an embodiment of the magnetic tape take-up apparatus according to the invention, and FIG. 4 is a side view in the direction of the arrow A in FIG. 3. For example, the tape take-up apparatus 1 is used for winding a magnetic tape T on a pair of tape winding bodies 2 and 3 (hereinafter referred to as "tape reels") to be incorporated in a video tape cassette.

In the following the operation of the take-up apparatus 1 is described in brief.

At first, the tape reels 2 and 3 (each of which has only one lower flange) are connected by a leader tape 10 having a predetermined length (only half of which is illustrated by half in FIG. 3). After the tape reels 2 and 3 are respectively mounted onto rotary shafts 4 and 5 to be rotationally driven in the take-up apparatus, the leader tape 10 is cut off about in the middle. The cut end of one part of the leader tape 10 connected to the take-up tape reel 2 is spliced with a bonding tape or the like to a forward end of a coiled raw magnetic tape reel 6 mounted in advance. The magnetic tape T is taken up by a predetermined length on the take-up tape reel 2 and then is cut off, whereafter the cut end of the magnetic tape T wound on the tape take-up reel 2 is spliced to the other cut end of the other part of the leader tape 10 connected to the other tape reel 3.

The cutting of the leader tape 10 and the magnetic tape T and the bonding between the leader tape 10 and the magnetic tape T are carried out by cutting and bonding means 9 provided with a tape end holding member, a cutter, a bonding tape, and so on. The magnetic tape T fed from the raw tape reel 6 is wound on the tape take-up reel 2 through a transport system 8 comprising guide pins, and guide rollers. The cutting and bonding means 9 are not shown in FIG. 4.

Figure 5:
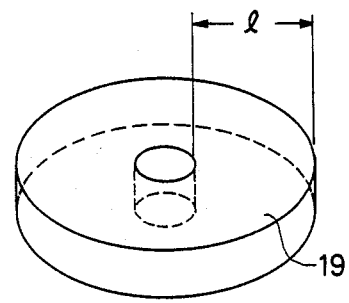
FIG. 5 is an enlarged perspective view of the magnet depicted in FIG. 4.
Figure 6:
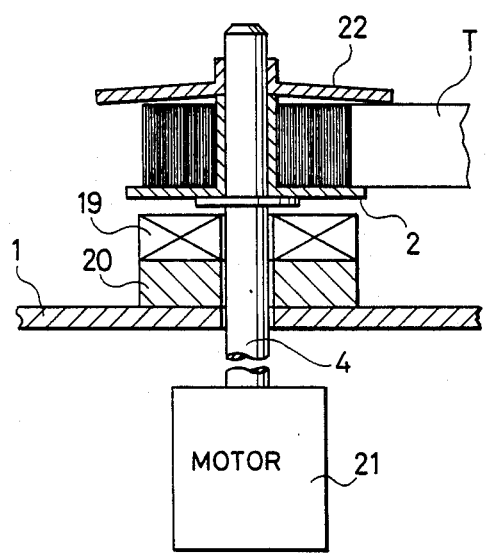
FIG. 6 is a partly enlarged sectional view taken in the axial direction in FIG. 4.

Although the above description is applicable to the conventional apparatus, the apparatus according to the invention is featured in the mount portion of the tape take-up reel 2. In other words, it is featured in that a permanent magnet 19 shaped like a doughnut as shown in FIG. 5 is provided so as to surround a rotary shaft 4 fitted in the center hole of the tape take-up reel 2 on which the magnetic tape T is to be taken up and that a pressure disk 22 is further provided. The permanent magnet 19 is attached to the body of the take-up apparatus 1 by being supported, for example, by a support 20 in the close vicinity of a flange 2a of the tape take-up reel 2. Preferably, the length 1 of the permanent magnet 19 in the radial direction of the take-up reel 2 as shown in FIG. 5 is selected to be at least larger than the width of the tape to be wound. The direction of the magnetic field of the permanent magnet 19 is made to be substantially along the shaft 4. The use of the magnetic field alone for winding tape has been disclosed in commonly assigned U.S. patent application, Ser. No. 010516, filed Feb. 3, 1987, which however does not disclose the pressure disk.

The pressure disk 22 formed of plastic resin such as polyoxymethylene (POM) or the like has a center hole engaged with the rotary shaft 4 such that the pressure disk 22 is slidable along and rotatable in synchronism with the shaft 4. Furthermore, the pressure disk 22 is slightly tapered, as shown in FIG. 5, so that the disk 22 approaches the flange 2a at its outer circumference. The radius of the pressure disk 22 is greater than that of the flange of the take-up reel 2 so that it always contacts the tape before it is wound.

The rotary shaft 4 is coupled with driving means 21, such as an electric motor or the like, so as to be driven to rotate by the driving means 21.

In the case where the magnetic tape T is wound by the take-up part arranged as described above, the magnetic tape T is attracted toward the magnet-side flange 2a owing to the magnetic force of the permanent magnet 19. At the same time, the magnetic tape T is wound on the tape take-up reel 2 while parts of the thus wound tape T attract each other. Furthermore, the magnetic tape T is biased to the flange 2a by the slight pressure (weight) of the pressure disk 22 acting on the tape edge. Accordingly, the change in attitude of the magnetic tape T is limited by the synergism of the magnetic force of the permanent magnet 19 and the pressing force of the pressure disk 22. As a result, the magnetic tape T is taken up under the very good condition that tape edge is trued up and the superior wound condition can be maintained.

The use in combination of the magnetic force by the permanent magnet 19 and the mechanical external force by the pressure disk 22 can minimize both the pressing force of the pressure disk 22 and the magnetic force of the permanent magnet 19. Accordingly, it is possible to avoid such problems that occur when the pressing force of the pressure disk 22 is larger, for example, such as injury at the tape edge, transformation of the tape, production of flakes form pressure disk material, and the like. Furthermore, a large tension is not required for winding the magnetic tape T. In addition, it is possible not only to reduce the permanent magnet 19 in size but to omit a subsequent magnetic erasing step.

The intensity of magnetic force of the permanent magnet 19 is not specifically limited. For example, the intensity of the magnetic force may be established under consideration of various conditions, such as the tape take-up tension, the kind of the magnetic tape T, the distance between the magnet 19 and the magnetic tape T, the tape take-up speed (tape running speed), the influence of the magnetic field on the magnetic tape T, and the like.

Although the embodiment shows the case where the permanent magnet 19 is fixed at a predetermined place, it is to be understood that the invention is not limited to the embodiment, but the permanent magnet 19 may be movable along the rotary shaft 4 so that the intensity of magnetic force applied to the magnetic tape T may be variable. Although the embodiment shows the case where the permanent magnet 19 is shaped like a doughnut corresponding to the flange 2a of the tape reel 2 so as to entirely surround the shaft 4, it is to be understood that the permanent magnet 19 may be formed to partly surround the shaft 4 for applying a magnetic field to the tape T at a partial area where the magnetic tape T is rolled in the tape reel 2, and that various modification may be made in the shape thereof.

Although the embodiment shows the case where the permanent magnet 19 is disposed near the flange 2a so as to surround the rotary shaft 4, the invention is not limited to the embodiment. It is a matter of course that the position and orientation of the permanent magnet 19 may be suitably changed as long as the magnet force in the same direction as the pressing direction of the pressure disk 22 can be applied to the magnetic tape T.

Although the embodiment shows the case where the pressure disk 22 is fitted onto the rotary shaft 4 in order to presses the magnetic tape T owing to its own weight, the invention is not limited to this embodiment. It is a matter of course that even in the case where the pressure disk 22 is not fitted to the rotary shaft of the tape reel 2, for example, in the case of a video tape reel in which a rotary shaft thereof cannot be inserted through the center of the reel, the same effect can be obtained by a pressure disk mounted on another shaft rotated in synchronism with the rotary shaft. Furthermore, even in the case where the pressing force of the pressure disk 22 cannot be obtained by its own weight, for example, even when the rotary shaft of the tape reel 2 is horizontally disposed, the same effect can be obtained by urging the pressure disk 22 by any urging force applying means, such as a spring or the like.

Although the embodiment shows the case where the reel has only the lower flange 2a, the invention is applicable to the case where the reel has no flange. The same effect can be obtained by use of other materials such as a slide plate or the like provided at one side of the reel.

Although the embodiment shows the case where the pressure disk is rotated in synchronism with the tape reel, it is not necessary that the pressure disk should be rotated in synchronism with the tape reel. The pressure disk may be fixed if the quality of the tape allows. Furthermore, it is a matter of course that the pressure disk may a be formed of other material such as metal or the like.

Although the embodiment shows the case where a permanent magnet is used as a magnet, it is to be understood that the invention is not limited thereto but an electromagnet may be used as a magnet. In the case where an electromagnet is used, the magnetic force of the electromagnet can be freely changed corresponding to the change of the current flowing therein.

Although description shows the case where only a single magnet is disposed in the vicinity of the rotary shaft 4 in the take-up apparatus 1, the invention is not limited thereto. For example, another magnet may be further disposed near the transport system 8 which includes a running path for the magnetic tape T. This other magnet would apply its magnetic force to the tape T in the direction of the tape width to thereby prevent vibrations of the magnetic tape T from occurring in the direction of the tape width for the purpose of stabilization of tape running.

The invention is not limited to the foregoing embodiment as stated in the beginning. For example, the invention is applicable to such a tape take-up apparatus in which a raw tape which is larger in width than final products is cut off into a plurality of raw tapes which are in turn taken up on the tape reels.

The term "magnet" used in this specification is not limited to "permanent magnet" or "electromagnet" as described above, and generically represents "magnetic field generating means", for example, inclusive of the concept "solenoid".

As described above in detail, according to the invention when a magnetic tape is taken up onto a tape winding body, both the magnetic force of a magnet and the mechanical external force, for example, owing to a pressure disk, are made to act on the magnetic tape, so that it is possible to minimize the mechanical external force as well as the magnetic force. Accordingly, conventional defects, such as injury and transformation of the magnetic tape, dropout of pressure disk material and the like, can be eliminated. Furthermore, close-fitting conditions between adjacent parts of the wound tape can be improved in spite of the relatively smaller degree of tape take-up tension. Moreover, it is possible not only to reduce the magnet in size but to omit a subsequent magnetic erasing step. In addition, the magnetic tape can be wound at a very preferable wound condition and at a higher speed compared with the prior art.

We claim:

1. A magnetic tape winding apparatus, comprising:
   a tape winding body having a flange on one side and to which a magnetic tape is attached;
   means for rotating said tape winding body, whereby said magnetic tape is wound on said tape winding body;
   a pressure disk disposed on a side of said winding tape opposite said flange for urging a tape edge of said magnetic tape against said flange, said pressure disk being a conically shaped disk sloping outward toward said flange; and
   magnetic means for generating at least in a vicinity of said tape winding body a magnetic field extending at least partially in a direction of a width of said wound tape to energize said magnetic tape toward said flange.

2. A magnetic tape winding apparatus as recited in claim 1, wherein said magnetic means is an annularly shaped magnet disposed near said flange and extending around a rotary shaft of said rotating means.

3. A magnetic tape winding apparatus as recited in claim 1, wherein said pressure disk is movable along a rotary shaft of said rotating means.

4. A magnetic tape winding apparatus as recited in claim 3, wherein said rotary shaft is vertically disposed and said pressure disk moves under the force of gravity.

* * * * *